United States Patent [19]

Yoshikawa et al.

[11] 4,157,303
[45] Jun. 5, 1979

[54] BIOLOGICAL WASTE WATER TREATMENT APPARATUS AND A METHOD OF PRODUCING THE SAME

[75] Inventors: Norihiro Yoshikawa, Yokohama; Ryoji Suzuki, Mishima, both of Japan

[73] Assignee: Dengyosha Machine Works, Ltd., Japan

[21] Appl. No.: 865,244

[22] Filed: Dec. 28, 1977

[30] Foreign Application Priority Data

Aug. 23, 1977 [JP] Japan .................... 52-100128

[51] Int. Cl.² .......................... B01D 21/00
[52] U.S. Cl. ..................... 210/150; 261/92; 264/572
[58] Field of Search ............ 210/17, 150, 151, 22 C; 261/92; 264/94

[56] References Cited

U.S. PATENT DOCUMENTS

| | | | |
|---|---|---|---|
| 2,209,877 | 7/1940 | Ferngren | 264/94 X |
| 3,613,890 | 11/1971 | Hellqvist | 210/150 |
| 3,703,238 | 11/1972 | Torpey | 210/151 |
| 3,886,074 | 5/1975 | Prosser | 210/150 |

FOREIGN PATENT DOCUMENTS 2554757 1/1976 Fed. Rep. of Germany .......... 210/150

*Primary Examiner*—William A. Cuchlinski, Jr.
*Attorney, Agent, or Firm*—Silverman, Cass & Singer, Ltd.

[57] ABSTRACT

A rotating disc-type biological waste water treatment apparatus comprises rotating disc assemblies rotatively driven while their lower halves are immersed in waste water. This rotating disc assemblies include a plurality of impellers, each comprises two parallel discs fixed to a main shaft, one of the discs being formed at its center with a suction opening, and impeller blades radial to the main shaft between the two discs, thereby increasing the surface areas of the rotating disc assemblies without increasing the driving power. Besides, only by closing the outer peripheries of the two discs the apparatus can perform the anaerobic denitrification.

According to the invention the impeller is divided into a plurality of sectors consisting of two sector side plates and two impeller blades which are integrally formed by blow molding and then arranged side by side to form a sector block. Thus produced sector blocks are then arranged about the main shaft and fixed thereto to form a rotating disc assembly.

12 Claims, 10 Drawing Figures

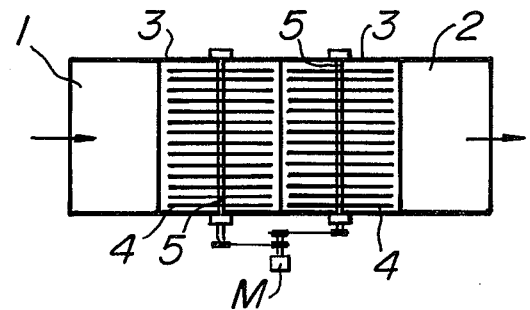
FIG._1a PRIOR ART
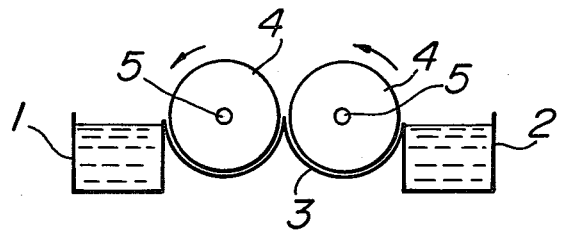
FIG._1b PRIOR ART
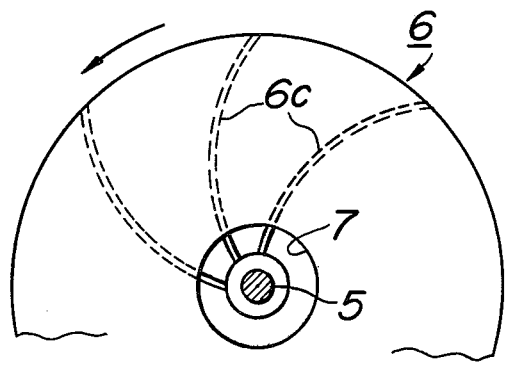
FIG._2a
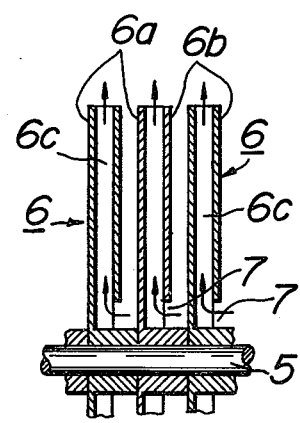
FIG._2b

BIOLOGICAL WASTE WATER TREATMENT APPARATUS AND A METHOD OF PRODUCING THE SAME

BACKGROUND OF THE INVENTION

1. Field of the Invention

The present invention relates to a rotating disc-type biological waste water treatment apparatus including one or more rotating disc assemblies arranged in tandem or in parallel and rotatively driven while their lower halves are immersed in waste water for its purification and more particularly novel rotating disc assemblies for use in the treatment apparatuses and a method of producing the rotating disc assemblies.

2. Description of the Prior Art

The rotating disc-type waste water treatment apparatuses for purifying waste water have been known, whose principle is based on the fact that the bacteria, microorganisms and algae propagated on the surfaces of rotating discs whose lower halves are immersed in the waste water take up and digest the nigrogen or phosphorus in waste water as nutrient. Various waste water treatment apparatuses of the aforenoted rotating type have been proposed. It is generally required for the treatment apparatus to provide great areas for attaching the microorganisms to improve its purification without increasing outer diameters of the discs and axial lengths. It is also required for the apparatus to be light weight, compact and durable for long years and to be driven by driving power as little as possible.

In some instances of the prior art, circular discs formed on their both surfaces with recesses and protrusions have been proposed for the purpose of increasing the surface areas to improve the purification. However, there has been tendency of such rotating discs to increase the driving power. In order to make the rotating discs light, attempts have been made to produce the discs of foamed polystyrene, waterproof plywood and the like. However, the discs made of these materials may be inferior in durability.

SUMMARY OF THE INVENTION

The object of the present invention is to provide an improved waste water treatment apparatus which eliminates all the above disadvantages of the prior art and includes broad surface areas of rotating assemblies for attaching microorganisms in spite of its short axial dimension to achieve the high performance of purification without increasing the driving power.

The further object of the present invention is to provide a novel method of producing the improved biological waste water treatment apparatus aforementioned which is suitable for the massproduction of the apparatuses.

The water waste treatment device including rotating discs according to the present invention comprises at least one rotating disc assembly rotatively driven while whose lower halves are immersed in the waste water, said rotating disc assembly comprising a plurality of impellers arranged in parallel side by side on a main shaft, and each said impeller comprising two parallel discs fixed to said main shaft, one of said discs being formed at its center with a suction opening and impeller blades radial to said main shaft between said two discs.

The method of producing a rotating disc assembly for a waste water treatment device, which includes impellers, each comprises two parallel discs fixed to a main shaft, one of the discs being formed at its center with a suction opening and impeller blades radial to the main shaft between the two discs, comprises steps of providing dies including therein a cavity corresponding to a configuration of a sector surrounded by said impeller blades, pouring a molten synthetic resin through an inlet nozzle into said dies, blowing air under a determined pressure into said dies through an air blow pipe inserted in the interior of said dies to form an integral sector member including main and side discs and impeller blades, clamping a number of said sector members arranged side by side at a determined interval to form a sector block, and arranging said sector blocks about said center shaft and fixing them thereto.

In order that the invention may be more clearly understood, preferred embodiments will now be described, by way of example, with reference to the accompanying drawings.

BRIEF DESCRIPTION OF THE DRAWINGS

FIG. 1a is a diagrammatic plan view of a typical rotating disc-type biological oxidation treatment apparatus of the prior art;

FIG. 1b is a sectional elevation of the apparatus shown in FIG. 1a;

FIG. 2a is an elevation of a rotating disc assembly used in the treatment apparatus according to the invention;

FIG. 2b is a sectional end view of the assembly shown in FIG. 2a;

FIG. 4b is a sectional end view of the tank as shown in FIG. 4a;

FIG. 6b is a sectional side view of the dies shown in FIG. 6a.

DETAILED DESCRIPTION OF THE PREFERRED EMBODIMENT

Figure 3:
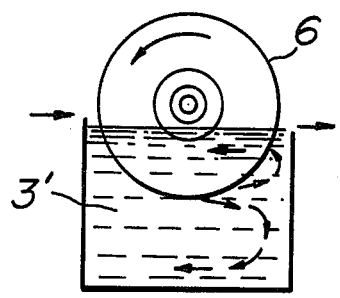
FIG. 3 is a sectional view of an aeration tank for a waste water required to stay for a long period of time, to which is applied the assembly shown in FIGS. 2a and 2b.

FIGS. 1a and 1b are schematic plan and elevational views of a typical rotating disc-type biological oxidation treatment apparatus comprising a primary precipitation tank 1 into which waste water flows primarily, a final precipitation tank 2 and a disc aeration tank or oxidation tank 3 therebetween including rotating disc assemblies 4 of which lower halves are immersed in the waste water in the aeration tank 3, main shafts 5 for these rotating discs 4 and a motor M for rotatively driving the main shafts 5.

According to the present invention, the rotating disc assembly 4 is made in the form of radial impellers 6 arranged on a main shaft 5 side by side in parallel with each other as shown in FIGS. 2a and 2b.

The impeller 6 in the form of a centrifugal impeller according to the invention comprises two thin discs or a main disc 6a and a side disc 6b in parallel with each other and perpendicular to the main shaft 5, arcuate or radial impeller blades 6c radially extending from the main shaft 5 between the thin discs 6a and 6b and fixed to these discs, the side disc 6b being formed at its center with a suction opening 7. The impeller 6 may be made of fiber reinforced or fiberglass reinforced plastics, polyvinyl chloride and the like having a relatively higher rigidity irrespective of its less specific weight, which make it possible to produce the discs and impellers thin to the order of 1-3 mm resulting in lightest possible rotating bodies to reduce the driving power therefor. The arcuate impeller blades are shown in the drawings. However, the blades may be formed in straight radial.

According to the invention, the rotating disc assemblies constructed as above described are may be arranged in tandem on a common shaft, or in parallel, that is, their center shafts are parallel to each other.

With this construction of the impeller, its surface areas for attaching generated microorganisms such as bacteria thereon can be increased to approximately twice those of flat discs of the prior art, with the result that the performance of the purification can be remarkably improved and the size of the entire device will become smaller because of the compact construction of the rotating disc assembly.

The rotating disc assembly 6 is slowly rotated with a speed less than 5 r.p.m. with its lower halves being immersed in the waste water, so that the most of the driving power for the assembly may result from the frictional losses of the discs. From the view point, according to the invention, the impeller comprises smooth flat discs and thin impeller blades of low resistance therebetween such that the friction loss at the discs of one impeller are as small as that of a flat disc. Accordingly, in conjunction with the fact that for achieving the same performance of purification the number of the impellers according to the invention is about one half of that in case of the flat discs, the power required for driving the rotating assembly is remarkably less.

FIG. 3 illustrates an other preferred embodiment of the invention. The ordinary rotary aeration tank is often insufficient for some kinds of waste water because they are required to stay in the tank for a long period of time due to their characteristics. In this case, it is required to provide a larger aeration tank 3' as shown in FIG. 3 and to stir or agitate the waste water in the aeration tank by means of a pump or blower. According to the invention, all that is required for the purpose is to increase the rotating speed of the rotating disc assembly 6. The increased rotating speed of the assembly increases the speed of the waste water delivered from the assembly to produce slowly circulating flows in the aeration tank 3' as shown in arrows in FIG. 3. A suitable selection of the rotating speed of the rotating assembly ensures the circulation of the waste water to the bottom of the tank no matter how it is deep to improve the aeration efficiency.

Figure 4A:
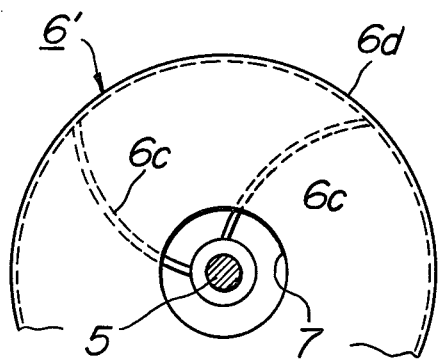
FIG. 4a is an elevation of other embodiment of the rotating disc assembly according to the invention having the anaerobic denitrification performance as well.
Figure 4B:
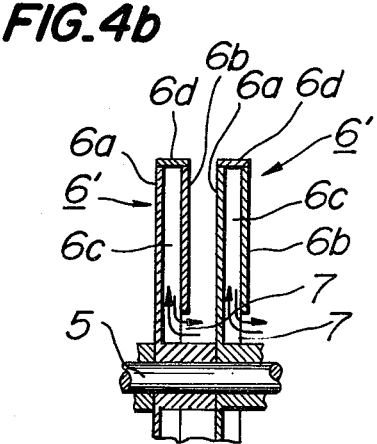
Figure 5:
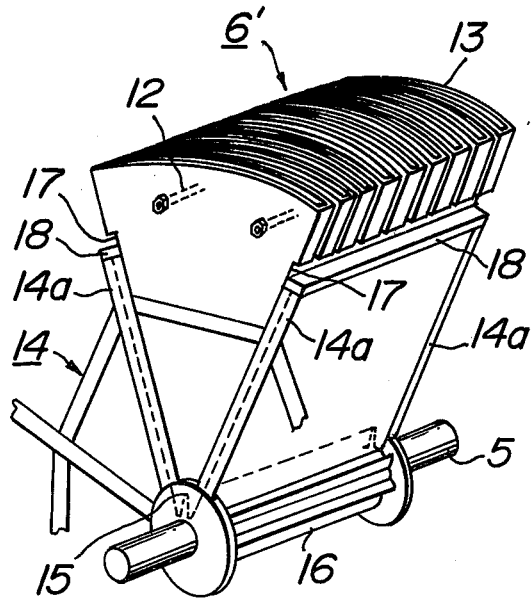
FIG. 5 is a perspective view of part of a rotating disc assembly according to the invention.

FIGS. 4a and 4b show a further preferred embodiment of the present invention wherein in addition to the arrangement of the impeller 6 according to the invention there is provided an annular band plate 6d closing the outlet periphery of the two discs. When the rotating disc assembly including the impellers 6' have such a construction is slowly rotated while being kept with the suction openings 7 slightly below the level of the waste water in the tank, the anaerobic denitrification is effected inside the impellers 6' and the aerobic nitration and oxidation are effected on the outer surfaces of the impellers to ensure the much more superior or effective purification to the prior art.

As described above, the centrifugal impeller according to the invention comprises two thin discs 6a and 6b in parallel with each other and radial or arcuate impeller blades 6c therebetween integrally jointed thereto by means of bonding material, screws or the like, the disc 6b being formed at its center with a suction opening 7 to form a rotating twin disc in the form of a centrifugal impeller 6. A plurality of the impellers 6 are fitted onto a main shaft 5 to form a multiple stage twin disc assembly.

Figure 6A:
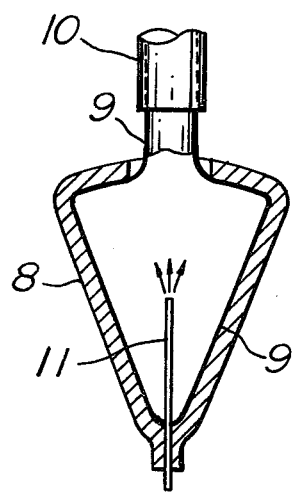
FIG. 6a is a sectional view of dies for blow molding sectors of the impeller according to the invention.
Figure 6B:
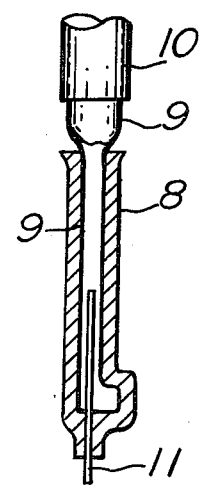

In order to facilitate the manufacture and assembly of the centrifugal impeller rotating twin disc, according to the invention the twin disc is divided into about two to twelve sectors. In manufacturing the rotating twin disc, referring to FIGS. 6a and 6b particular molten plastic material 9 such as polyethylene is poured in the form of a cylinder through an inlet nozzle 10 into a dies 8 having a cavity corresponding to the configuration of the divided sector of the twin disc. In this case, the thickness of the molten material 9 flowing down from the inlet nozzle 10 can be adjusted by means of a computer (not shown) such that the plastic material is uniformly distributed on the inner surfaces of the dies 8 with a determined thickness. Then the inlet nozzle 10 is closed and air is forced under a determined pressure into the dies through an air blow pipe 11 inserted into the inside of the dies 8, so that the plastic material 9 is brought into more close contact with the inside of the dies 8 and solidifies under the contact condition.

The blow molding with the particular plastic material such as polyethylene makes it possible to mechanically produce the completely integrally molded sectors 6' of the centrifugal impeller rotating twin disc having a very high rigidity for a short period of time without requiring any jointing means such as bonding material. It is of course possible to blow mold the impellers irrespective of the presence or absence of the band plates 6d closing the peripheries of the two discs.

A plurality of the sectors 6' thus manufactured are arranged side by side at a determined interval and clamped by means of a few clamping bolts 12 to form a sector block 13 forming one part of an impeller.

The sector block 13 is then inserted between two radial frames 14a of front and rear sector block mounting frames 14 secured to the main shaft 5 in a manner embracing the sector block 13, such that positioning notches 15 previously formed in sector centers of the respective sectors 6' are fitted onto radial fittings 16 previously secured to the main shaft 5 to fix the sector block 13 to the mounting frames 14. In this manner, several sector blocks 13 are assembled by inserting them into the radial frames 14a to form the rotating disc assembly.

The sector block 13 is formed in the proximity of the outer peripheries of its radial surfaces with notches 17 corresponding to the outer ends of the radial frames 14a of the mounting frames 14. When the several sector blocks 13 are assembled between the mounting frames 14, sector block fixing fittings 18 are inserted into the notches 17 and fixed with their ends to the outer ends of the radial frames 14a, so that the respective sector blocks 13 are fastened between the fixing fittings 18. The centrifugal force and rotating torque acting upon the entire rotating disc assembly may be supported by the fixing fittings 18 and the mounting frames 14. Such a fixing means serves to render easy the assembly of the impeller and to obtain a rotating disc assembly having a sufficient strength.

The fixing fittings 18 do not expose or do not protrude beyond the disc assembly after it has been assembled, so that the fixing fittings 18 do not cause any waves of waste water and ensure the quiet operation of the rotating disc assembly.

As above described, according to the invention the radial twin disc of the centrifugal rotating disc waste water treatment device is divided into several sectors which are blow molded to form integral sectors by pouring particular molten plastic material such as polyethylene into the dies whose cavities correspond to the sectors. It should be noted that the method according to the invention is suitable to mass-produce the treatment device.

According to the present invention a plastic material having high rigidity but less specific weight is employed for the material of the rotating assemblies, so that with relatively large rotating assemblies having diameters of 2-5 m, the thickness of the discs can be in the order of 1-3 mm and the width of outlet of one impeller and the interval between the impellers can be in the order of 15-30 mm. As the result, the rotating assemblies become compact and their weight becomes as light as possible.

As can be seen from the above description, the waste water treatment apparatuses provided with the rotating discs in the form of centrifugal impellers according to the invention includes the surface areas of the rotating assemblies for attaching the generated microorganisms become large in spite of its short axial dimension and is larger approximately twice than those of the flat plate type rotating discs and tends to cause the waste water and air alternately to pass through the inside of the impellers with the aid of the centrifugal force to facilitate the attaching and aerating the microorganisms and smoothly effect the natural removal of accumulated microorganisms from the surfaces of the rotating assemblies resulting into the high performance of purification. On the other hand, such a high performance of purification can be achieved without increasing the power for driving the rotating disc assembly due to the friction losses at the rotating discs, so that the greatly high purification efficiency can be accomplished according to the invention. Furthermore, the apparatus according to the invention is characterized by the annular band plates 6d enclosing the outlets of the impellers, so that the apparatus performs the anaerobic denitrification as well as aerobic oxidation and nitration.

Although there has been shown and described specific structures, it is to be clearly understood that the same were merely for the purpose of illustration, and that changes and modifications may readily be made therein by those skilled in the art without departing from the spirit and scope of the invention.

What is claimed is:

1. A biological waste water treatment apparatus for purification of waste water retained in a tank, said apparatus comprising, at least one rotating disc assembly carried on a main shaft and adapted to be rotatively driven, the discs having lower halves immersed in the waste water retained in the tank, said rotating disc assembly including a plurality of centrifugal impellers arranged in parallel side by side relationship on said shaft, each said centrifugal impeller including two parallel discs, a plurality of radial blades positioned between the parallel discs, one of said discs being formed at its center with a suction opening.

2. An apparatus as set forth in claim 1, wherein said rotating disc assemblies are arranged in tandem.

3. An apparatus as set forth in claim 1, wherein said rotating disc assemblies are arranged in parallel.

4. An apparatus as set forth in claim 1, wherein said rotating disc assemblies are arranged in tandem.

5. An apparatus as set forth in claim 1, wherein said rotating disc assemblies are arranged in parallel.

6. An apparatus as claimed in claim 1, in which the outlet periphery of said two discs of each said centrifugal impeller is closed by an annular band plate.

7. An apparatus as claimed in claim 1 in which each centrifugal impeller comprises a plurality of sectors, each of said sectors being surrounded by two parallel discs and two blades to form a passage of generally box-shaped configuration, each sector having an opening in the proximity of the center of the impeller, a plurality of said sectors being arranged in side by side configuration at predetermined intervals and clamped together to form a sector block, the sector blocks being arranged around said center and fixed thereto to form said impeller.

8. A method of producing a rotating disc assembly for a waste water treatment apparatus, said rotating disc assembly including impellers, each impeller comprising two parallel discs fixed to a main shaft, one of said discs being formed at its center with a suction opening and impeller blades radial to said main shaft between said two discs, comprising steps of providing dies including therein a cavity corresonding to a configuration of a sector surrounded by said impeller blades, pouring a molten synthetic resin through an inlet nozzle into said dies, blowing air under a determined pressure into said dies through an air blow pipe inserted in the interior of said dies to form an integral sector member including main and side discs and impeller blades, clamping a number of said sector members arranged side by side at a determined interval to form a sector block, and arranging said sector blocks about said main shaft and fixing them thereto.

9. A method as set forth in claim 8, wherein said synthetic resin is polyethylene.

10. A method as set forth in claim 8, wherein said step of arranging and fixing said sector blocks to said main shaft comprises a step of inserting said sector block between two radial frames of front and rear sector block mounting frames secured to said main shaft such that positioning notches previously formed in sector centers of said respective sectors are fitted onto radial fittings previously secured to the main shaft to fix the sector block to the mounting frames.

11. A method as set forth in claim 10, wherein said step of fixing said sector blocks to said main shaft comprises steps of forming notches in the sector block in the proximity of outer peripheries of its radial surfaces corresponding to outer ends of said radial frames of said mounting frames, inserting sector block fixing fittings into said notches after said sector blocks have been arranged about said main shaft and fixing ends of said sector block fixing fittings to outer ends of said radial frames.

12. A method as set forth in claim 11, wherein said notches are so formed in the sector block that said fixing fittings do not protrude beyond the disc assembly after it has been assembled.

* * * * *